June 26, 1962  C. R. KUZELL  3,041,146
PROTHROMBIN TIME DETERMINING APPARATUS
Filed May 12, 1958

CHARLES R. KUZELL
INVENTOR.

BY
*Flehr and Swain*

United States Patent Office 3,041,146
Patented June 26, 1962

3,041,146
PROTHROMBIN TIME DETERMINING
APPARATUS
Charles R. Kuzell, Apt. 13D, 2201 N. Central Ave.,
Phoenix, Ariz.
Filed May 12, 1958, Ser. No. 734,576
2 Claims. (Cl. 23—253)

This invention relates generally to an apparatus for determining the prothrombin time of blood, and more particularly to an apparatus in which the determination may be made on relatively small samples of blood such as may be obtained by lancing a fingertip.

In many instances, the determination of prothrombin time of blood becomes a matter of life or death. Several methods exist for determining this time. One method requires hospitalizing the patient and obtaining a blood sample intravenously. The blood is then treated to remove the calcium, placed in a centrifuge to obtain the plasma, and the plasma is reacted with a reagent in a test tube to determine the prothrombin time. The test is time consuming; consequently, the results are not immediately available. To overcome these difficulties, a method known as the "Manchester Method" has been developed. The "Manchester Method" is described in Manchester, B., "The Prevention of Myocardial Infarction," A.M.A. Arch. Int. Med. 100, 959–964, December 1957, and Manchester, B., and Rabkin, B., "The Control of Dicumarol Therapy in Myocardial Infarction by a Simple Blood Prothrombin Test," Circulation 10, 691 (1954). In this method, relatively small amounts of blood such as can be obtained by lancing a finger are sufficient. The method can be performed in the doctor's office, at bedside or in conventional hospital procedures. The accuracy and consistency of the results under this method are dependent upon, among other things, maintaining the temperature of the reactants and the equipment used at normal body temperature.

It is a general object of the present invention to provide an apparatus suitable for carrying out the above test.

It is another object of the present invention to provide an apparatus of the above character which is adapted to maintain substantially constant temperature of the reactants and the equipment used in carrying out the test.

It is another object of the present invention to provide a device in which the temperature is controlled within predetermined limits and in which means are provided for timing a reaction.

It is another object of the present invention to provide an apparatus which is simple to operate, easy to transport, in which rapid, relatively accurate determinations may be made, and which is inexpensive to manufacture.

These and other objects of the invention will become more clearly apparent from the following description when taken in conjunction with the accompanying drawings.

Referring to the drawing.

Figure 1:
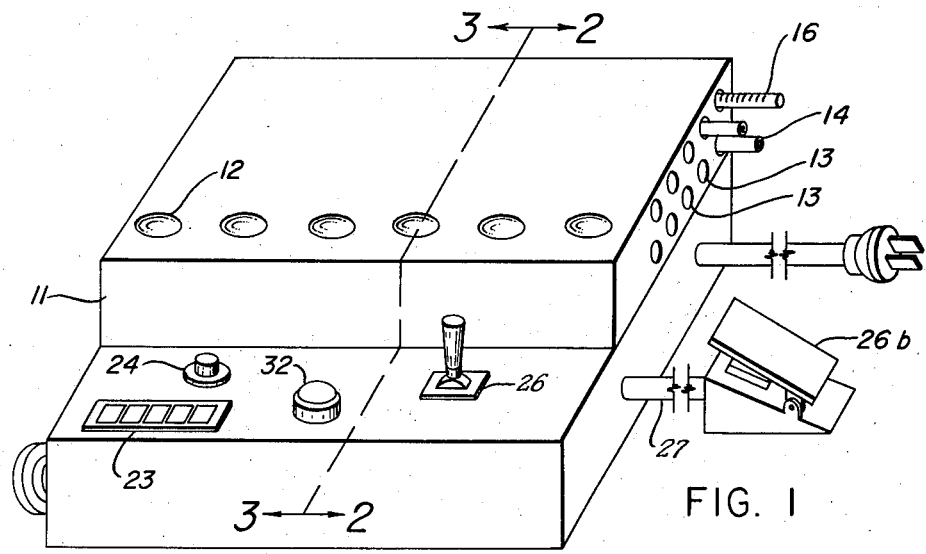
FIGURE 1 is a perspective view showing an apparatus in accordance with the invention.
Figure 2:
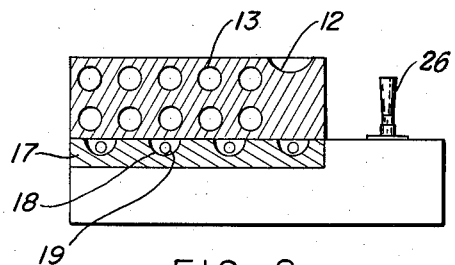
FIGURE 2 is a sectional view along the line 2—2 of FIGURE 1.
Figure 3:
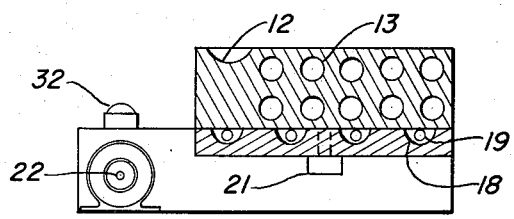
FIGURE 3 is a sectional view along the line 3—3 of FIGURE 1.

The apparatus illustrated includes a relatively large block of metal 11 which forms the working surface and contains the equipment required to carry out a test. The metal used in the block 11 is preferably a metal having relatively high conductivity and high specific heat. It has been found that aluminum is suitable for these purposes. Reaction recesses (concavities or dimples) 12 are formed in the upper surface of the aluminum block. These recesses are smoothed and polished to give a suitable surface for carrying out a reaction to determine the prothrombin time. The recesses are preferably spherical in shape as indicated in FIGURES 1, 2 and 3 and polished. Recesses of this type may be formed, as for example, by pressing a steel ball into the relatively soft aluminum.

The equipment for carrying out the analysis is preferably maintained at body temperature. Thus, the block includes a plurality of wells 13 which are adapted to receive pipettes 14 and to maintain them at substantially the temperature of the block 11. A well is provided to receive a thermometer 16 which is adapted to indicate the temperature of the block.

The pipettes 14 are employed to draw a sample of blood for carrying out the determination as will be presently described in detail. The block 11 may be suitably heated, as for example, by dipping the same in a water bath, and observing the temperature indicated by the thermometer 16. The block is removed when the temperature reaches a predetermined value below body temperature and the temperature of the block is allowed to coast up to the correct value. The temperature remains constant for a relatively long period of time because of the thermal capacity of the block.

However, I have found that it is preferable to provide an apparatus in which the temperature is thermostatically controlled. Referring to FIGURE 2, the block 11 is placed on a heater 17 which includes a plurality of grooves 18 which carry electrical heating elements 19. Power is suitably provided to the heating elements 19 whereby the same serve to heat the block. A thermostat 21 may be provided for controlling the application of electrical energy to the heater. The thermostat may be any suitable device which serves to open a switch when the temperature reaches a predetermined value. I have found that devices of the type manufactured by Fenwal Inc., Ashland, Mass., are suitable for this purpose. The devices manufactured by this company include a snap-action switch which is so arranged that a sealed bellows activates a snap-action switch. It is, of course, to be understood that although a particular type of thermostat has been described as being suitable, that other thermostats well known in the art may be employed for this purpose.

Inasmuch as the reaction must be timed within fractions of a second, it is desirable to provide a timer. Such a timer might be a stop watch or the like which is manually controlled. I have illustrated a preferable means for accurately determining the time. The means comprises a synchronous motor 22 which drives a mechanical counter 23 such as a "Veeder-Root" counter which serves to count revolutions of the motor shaft. Thus, by energizing the motor which runs at a synchronous frequency, the counter will act as a timer indicating elapsed time. The motor may be controlled by a switch 26 placed on the panel of the instrument, or may be operated by a foot switch 26 which includes a cord 27. By employing the foot switch, the hands are free to carry out the determinations while the elapsed time is being measured.

Figure 4:
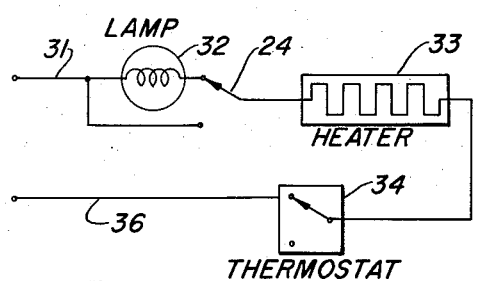
FIGURE 4 is a schematic circuit diagram of the electrical portion of the apparatus of FIGURE 1.

Referring to FIGURE 4, a schematic circuit diagram of a suitable electrical circuit for controlling the temperature is illustrated. A manual switch is provided for connecting directly to the input line 31 or through the lamp 32 to the input line. By connecting directly to the input line 31, full power is applied to the heater 33 whereby the same serves to rapidly heat the block 11. After a predetermined time, the switch may be switched to include the lamp 32 in series with the heater whereby the power applied to the heater is reduced. The lamp 32 may be placed on the panel of the instrument as illustrated in FIGURE 1 and serve to indicate when power is being applied to the heater. Serially connected therewith is the thermostat 34 which serves to open the circuit 36 when the predetermined temperature is reached.

Operation of the device to bring the same to temperature and to control the same would be to place the manual switch to connect directly to the power source for a predetermined period of time which may be determined by carrying out an experimental run and then switching the manual switch to bring the lamp in circuit to reduce the power applied to the heater. The thermostat then takes over control and serves to open and close the circuit to apply power to the heater as required.

A prothrombin time determination is carried out substantially as follows. The block 11 is brought up to body temperature either by immersing the block in hot water or by employing equipment which includes an electrically operated heater of the type described with reference to FIGURE 4. When the block has reached a suitable temperature as indicated by the thermometer 16, the apparatus is ready for carrying out a determination. The reagent (a compound of Bacto-Thromboplastin) is placed in one or more of the recesses 12. Suitable reagents are well known in the art. The amount of reagent is dependent upon the type of reagent used. In one particular example, "Permaplastin" (Difco Laboratories, Detroit, Michigan) was used. For this reagent, an amount equal to the amount of blood which is subsequently added is required. The finger is lanced and a drop of blood is formed on the finger. A pipette 14, at substantially body temperature, is removed from the apparatus. A sample of blood, for example 20 cubic millimeters, is drawn into the pipette. The blood is then added to the reagent to carry out a determination. Simultaneously, with this addition of blood, the timer is started by switching the switch 26, or by pressing the foot pedal 26b, or by starting a stop watch, as the case may be. The lancing blade or a suitable probe is continuously drawn upwardly along the sides of the recess until the blood coagulates, at which time the timing is stopped and the reading of the elapsed (prothrombin) time is obtained.

Figure 5:
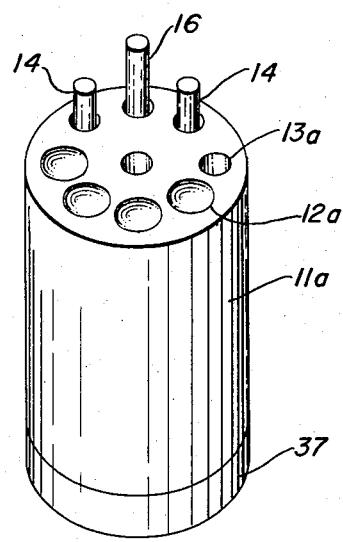
FIGURE 5 is a perspective view of another embodiment of the invention.

Referring to FIGURE 5, a modified embodiment of the invention is shown. The block 11a is a cylindrical block which is provided with recesses 12a and wells 13a. A thermometer 16 and pipettes 14 are shown disposed in some of the wells. A thermostatically controlled heating unit 37 of the type previously described may be provided to maintain the block at substantially constant temperature.

I claim:

1. A prothrombin time determining apparatus comprising; a block of heat conductive metal, controllable heating means in heat transfer relation to said block for holding said block at a predetermined temperature, a plurality of deep pockets formed in said block to receive accessories such as thermometers, capillary tubes, and the like for keeping said accessories at said predetermined temperature, means on said block adjacent one edge thereof and defining at least one shallow dished concavity, and timing means having a visual indicator for indicating an elapsed time and control means for starting and stopping said timing means, said control means being positioned closely adjacent said one edge and said shallow dished concavity whereby an operator may simultaneously manipulate said control means and reagent materials in said concavity.

2. Apparatus as defined in claim 1 including a housing, said block being mounted on said housing, said visual indicator being visible through a wall of said housing, and said control means being mounted on a wall of said housing closely adjacent said block.

References Cited in the file of this patent

UNITED STATES PATENTS

| | | |
|---|---|---|
| 1,691,562 | Bissell | Nov. 13, 1928 |
| 1,975,245 | Zackheim | Oct. 2, 1934 |
| 2,041,290 | Jackson | May 19, 1936 |
| 2,276,021 | Copley | Mar. 10, 1942 |
| 2,417,802 | Longstreet | Mar. 18, 1947 |

OTHER REFERENCES

Eimer and Amend: 85th Anniversary Catalogue, Laboratory Apparatus and Supplies, 1936, pages 65 to 67.

Noller: Anal. Chem., vol. 14, #10 (1942), page 834.